(12) United States Patent
Lamfalusi et al.

(10) Patent No.: US 9,424,445 B2
(45) Date of Patent: *Aug. 23, 2016

(54) CARD READER HAVING DISCRIMINATOR CONTACT

(71) Applicant: Square, Inc., San Francisco, CA (US)

(72) Inventors: Michael C. Lamfalusi, Cupertino, CA (US); Kartik Lamba, Berkeley, CA (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/947,162

(22) Filed: Nov. 20, 2015

(65) Prior Publication Data

US 2016/0148023 A1     May 26, 2016

Related U.S. Application Data

(63) Continuation of application No. 14/549,338, filed on Nov. 20, 2014.

(51) Int. Cl.
*G06K 7/00*     (2006.01)
*G07G 1/01*     (2006.01)

(52) U.S. Cl.
CPC ............ *G06K 7/0086* (2013.01); *G06K 7/0004* (2013.01); *G06K 7/0026* (2013.01); *G07G 1/01* (2013.01)

(58) Field of Classification Search
CPC . G07F 19/20; G07F 7/1008; G06Q 20/1085; G06Q 20/341; G06K 7/10881; G06K 7/10851; G06K 7/10772; G06K 17/0022; G06K 19/07749; G06K 19/12; G06K 19/06187; G06K 7/14; B42D 15/10

USPC .............. 235/380, 382, 379, 472.01, 472.02, 235/472.03, 487, 492, 493, 440
See application file for complete search history.

(56) References Cited

U.S. PATENT DOCUMENTS

| | | |
|---|---|---|
| 5,494,136 A | 2/1996 | Humble |
| 6,098,888 A | 8/2000 | Praden |

(Continued)

FOREIGN PATENT DOCUMENTS

| | | |
|---|---|---|
| WO | 2013/051032 A1 | 4/2013 |
| WO | 2015/001468 A1 | 1/2015 |
| WO | 2016/081804 A1 | 5/2016 |

OTHER PUBLICATIONS

Restriction Requirement mailed Feb. 27, 2015, for U.S. Appl. No. 14/592,102, of Chen, Y., et al., filed Jan. 8, 2015.

(Continued)

*Primary Examiner* — Karl D Frech
(74) *Attorney, Agent, or Firm* — Polsinelli LLP

(57) ABSTRACT

A card reader for a point-of-sale system that is configured to accept both magnetic strip-type and integrated circuit (IC) chip-type payment cards. The card reader is a component of a point-of-sale system including a portable computing device in communication with the card reader that is configured to present a first graphical user interface (GUI) when a magnetic stripe-type card is detected and a second GUI when an IC chip-type card is detected in the card reader. The card reader comprises a slot configured to receive the payment card, a magnetic reading device and an IC chip reading device. The card reader also includes a discriminator contact disposed within the slot that is configured to conduct across a surface of a metal pad of the IC chip-type card prior to the CI chip reading device making contact with the IC chip.

20 Claims, 9 Drawing Sheets

(56) References Cited

U.S. PATENT DOCUMENTS

| | | | |
|---|---|---|---|
| 6,766,994 B2 | 7/2004 | Serbinski et al. | |
| 7,048,184 B2 | 5/2006 | Persky | |
| 7,370,804 B2 * | 5/2008 | Ishii | G06K 7/0021 235/475 |
| 7,712,670 B2 * | 5/2010 | Sauerwein, Jr. | G06Q 10/083 235/383 |
| 8,768,838 B1 | 7/2014 | Hoffman | |
| 9,286,494 B1 | 3/2016 | Lamfalusi et al. | |
| 2004/0034564 A1 | 2/2004 | Liu | |
| 2007/0257110 A1 | 11/2007 | Schmidt et al. | |
| 2008/0016456 A1 | 1/2008 | Friedland et al. | |
| 2009/0006262 A1 | 1/2009 | Brown et al. | |
| 2012/0023026 A1 | 1/2012 | Chen et al. | |
| 2012/0197744 A1 | 8/2012 | Rose et al. | |
| 2012/0254038 A1 | 10/2012 | Mullen | |
| 2012/0290420 A1 | 11/2012 | Close | |
| 2013/0006847 A1 | 1/2013 | Hammad et al. | |
| 2013/0144731 A1 | 6/2013 | Baldwin et al. | |
| 2013/0282501 A1 | 10/2013 | Edwards et al. | |
| 2013/0299574 A1 | 11/2013 | Theobald | |
| 2014/0022211 A1 | 1/2014 | Karpin et al. | |
| 2014/0047390 A1 | 2/2014 | Thorsander et al. | |
| 2014/0071043 A1 | 3/2014 | Jung et al. | |

OTHER PUBLICATIONS

Non-Final Office Action mailed Mar. 13, 2015, for U.S. Appl. No. 14/572,692, of Bell, B., et al., filed Dec. 16, 2014.
Non-Final Office Action mailed May 21, 2015, for U.S. Appl. No. 14/592,102, of Chen, Y., et al., filed Jan. 8, 2015.
Final Office Action mailed Jul. 10, 2015, for U.S. Appl. No. 14/572,692, of Bell, B., et al., filed Dec. 16, 2014.
Non-Final Office Action mailed Sep. 16, 2015, for U.S. Appl. No. 14/549,338, of Lamfalusi, M., et al., filed Nov. 20, 2014.
Notice of Allowance mailed Nov. 10, 2015, for U.S. Appl. No. 14/549,338, of Lamfalusi, M., et al., filed Nov. 20, 2014.
Final Office Action mailed Dec. 9, 2015, for U.S. Appl. No. 14/592,102, of Chen, Y., et al., filed Jan. 8, 2015.
International Search Report and Written Opinion for PCT Application No. PCT/US2015/051082 mailed Dec. 18, 2015.
International Search Report and Written Opinion for PCT Application No. PCT/US2015/051090 mailed Dec. 21, 2015.
Restriction Requirement mailed Jan. 22, 2016, for U.S. Appl. No. 14/848,123, of Guise, M., et al., filed Sep. 8, 2015.
International Search Report and Written Opinion for PCT Application No. PCT/US2015/061771 mailed Jan. 29, 2016.
Non-Final Office Action mailed Mar. 11, 2016, for U.S. Appl. No. 14/572,692, of Bell, B., et al., filed Dec. 16, 2014.

* cited by examiner

CARD READER HAVING DISCRIMINATOR CONTACT

CROSS-REFERENCE TO RELATED APPLICATIONS

This application is a continuation of U.S. patent application Ser. No. 14/549,338, entitled "CARD READER HAVING DISCRIMINATOR CONTACT", filed on Nov. 20, 2014; which is hereby expressly incorporated herein by reference in its entirety.

BACKGROUND

Consumers can interact with merchants to conduct various financial payment transactions. For example, a consumer can conduct a transaction with a merchant at a point-of-sale system using cash, a transaction card, or other transaction instrument. Conventional systems can include expensive and bulky financial transaction electronics, as may include a card reader for payment cards (e.g., debit or credit cards), a cash drawer, monitors, keyboards, and various other electronic devices. Oftentimes, however, this equipment can be costly and large, requiring additional space and resources. Further, in retail stores where space is limited, a merchant may not require all components that come with conventional point-of-sale system or at least may find it desirable to piece together a modular or mobile system to streamline the checkout experience. Further still, merchants may find approaches to conducting a financial transaction using conventional systems burdensome, where during a transaction, if a customer pays by credit card, the merchant has to enter a transaction amount and the merchant or the customer has to swipe the credit card in the card reader. Further, many transactions require that the customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN), many of which techniques require additional financial transaction electronics and time. Some point-of-sale systems require multiple types of card readers and/or complex and bulky card-reading equipment in order to accept multiple types of payment cards.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
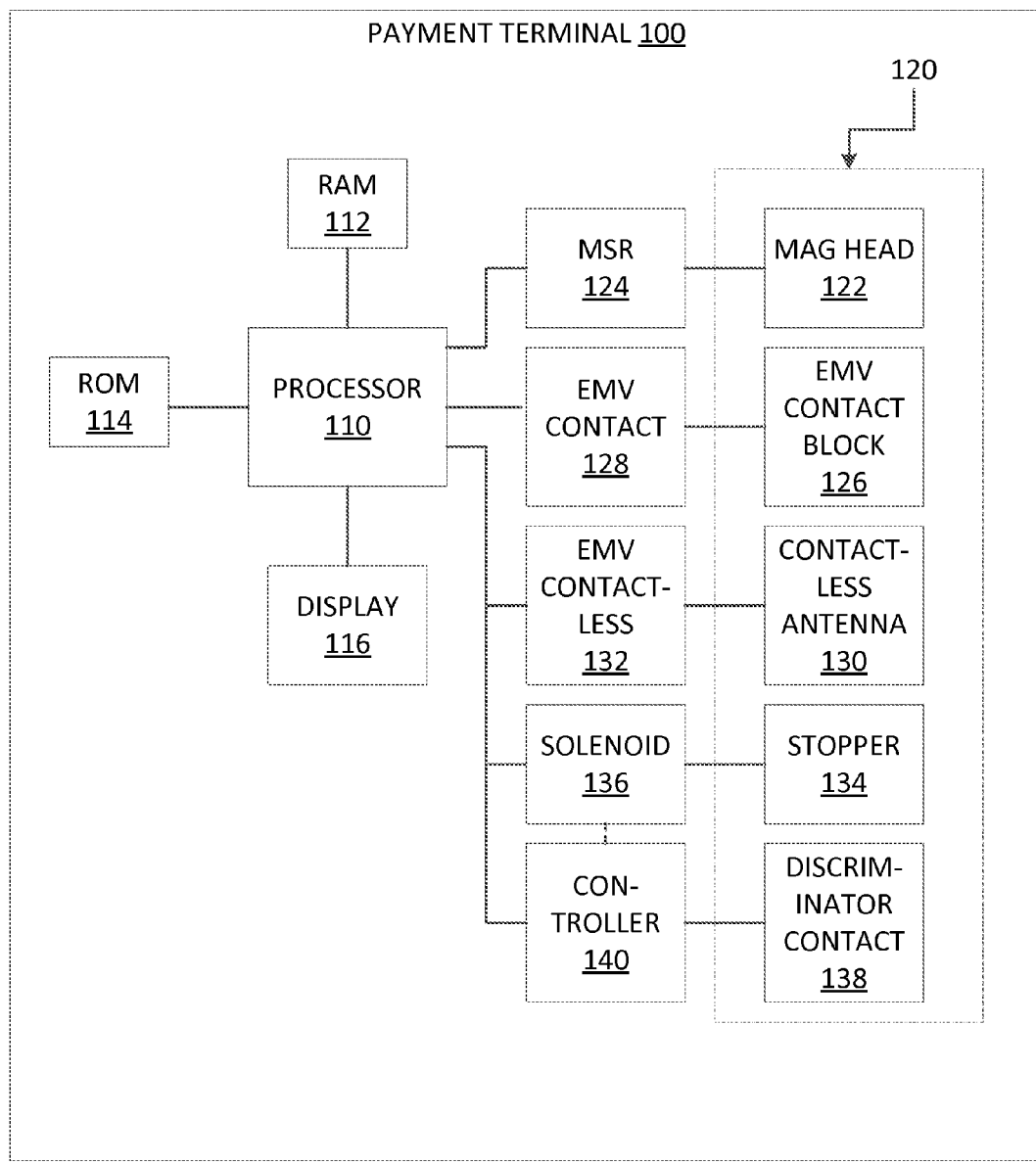
FIG. 1 illustrates an example block diagram of a payment terminal configured to receive both magnetic stripe-type cards and IC chip-type cards, and having a discriminator contact, in accordance with various embodiments.

Systems and methods in accordance with various embodiments of the present disclosure overcome one or more of the above-referenced and other deficiencies in conventional approaches to conducting financial transactions. In particular, in accordance with various embodiments, approaches provide for a point-of-sale system that facilitates the transfer of funds between entities (e.g., customers and merchants).

For example, in accordance with various embodiments, a card reader is used in performing at least part of a payment transaction at a point-of-sale system. The card reader is configured to receive both magnetic stripe cards and IC chip-type cards. The card reader can be a slot on a consumer terminal. The slot can be part of a standalone card reader accessory in some embodiments, or directly integrated into a portable computing device that is part of the point-of-sale system. For example, the slot can be an internal component of a personal computing device (e.g., a mobile phone, a tablet computer, etc.) that is used in a payment transaction by inserting payment cards into the slot. The card reader can be a separate component independent of the portable computing device in some embodiments.

One aspect of point of sale systems that accept both IC chip-type cards and magnetic stripe-type cards is that such systems must present different graphical user interface features to a payer (e.g., customer) utilizing an IC chip than to a payer utilizing a magnetic stripe. A point of sale system must first recognize the type of card being used, and then present the user interface, but such steps provide a delay in completing a transaction. Every delay is important, especially for high volume payees (e.g., merchants).

The card reader of the present technology includes at least one discriminator contact configured to determine the type of card being provided to the card reader. In this manner, the discriminator contact can identify the card type for early card-type detection so that, for example, the appropriate interface can be provided to the customer, meaning that, for example, a PIN-entry display is provided for a chip-type card, while a signature-entry display is provided for a swipe-type card. The discriminator contact can also be in communication with a solenoid-actuated stopper that is provided in the card reader to locate the payment card at a desired position within the card reader. For example, the stopper can prevent the chip-type cards from full insertion into the card reader, while allowing magnetic stripe-type cards to be fully inserted, thus providing feedback to a cardholder that the desired payment mechanism (the IC chip) is being used, and further giving a cardholder peace of mind that an imprint (digital or physical) of the card isn't being taken inappropriately. The discriminator contact can further be used to differentiate a non-working chip-type card from a magnetic stripe-type card so that, for example, an interface can be provided to the user that the chip-type card is not working if that is the case.

Advantageously, such a card reader provides for reading both magnetic stripe-type cards and IC chip-type cards. Further, additional functionalities can be provided based upon the type of card detected by the discriminator contact, such as providing a user interface to the user that is specific to the type of card that has been detected. More particularly, a chip-type interface is provided for detected chip-type cards and a magnetic stripe-type interface is provided for detected magnetic stripe-type cards. The card reader further can differentiate a magnetic stripe-type card from a non-working chip-type card via the discriminator contact. The presence of the chip-type card is determined when the discriminator contact forms a complete circuit (in some embodiments, the circuit is completed only momentarily) by conducting across the metal contact pad of the ship-type card. Thus, a card having an IC chip that does not work registers as a chip-type card.

Other advantages, variations, and functions are described and suggested below as may be provided in accordance with the various embodiments. FIG. 1 illustrates an example block diagram of a payment terminal used as part of a point-of-sale system that conducts transactions during the sale of a product, a good or a service. In this example, a transaction is conducted at a payment terminal using a payment card, e.g., a credit card, a magnetic stripe-type card, or an IC chip-type card. It should be noted that although the user is shown conducting a transaction using a payment card, in various embodiments, transactions can be conducted through a card-less payment account that is linked to the payment card. Other transactions include person-to-person, account-to-account, electronic cash, among others. These payment instruments are usually associated with an established consumer account. It should be further noted that although a credit card is shown to conduct transactions, approaches described herein apply to other types of financial payment instruments including, for example, debit cards, and card-less payment accounts. As described, in conventional point-of-sale systems, the equipment used can be costly and large, requiring additional space and resources. Further, in retail stores where space is limited, a merchant may not require all components that come with a conventional point-of-sale system or at least may find it desirable to piece together a modular or mobile system to streamline the checkout experience. Further still, in some embodiments, the computing device may only be capable of supporting a single peripheral device due to the device only having one physical interface, such as is the situation with many mobile phones and/or table computers. Accordingly, in accordance with various embodiments, approaches provide for a point-of-sale system that includes a payment terminal with a card reader having at least one discriminator contact to facilitate a financial payment transaction between entities (e.g., customers and merchants). The discriminator contact is configured to determine the type of card inserted into the card reader to properly present interfaces to the merchant and/or the consumer and perform other transactions associated with the sale of the product, good or service.

FIG. 1 illustrates the payment terminal 100 includes a processor 110 having RAM memory 112 for storage of data and flash ROM 114 for use in processing data. The processor is operatively connected to a display 116 for displaying information and graphical user interface (GUI) displays to the consumer at the payment terminal 100 and other information to the consumer. A card reader 120 is included in the payment terminal 100 and includes a magnetic head reader 122 coupled to a magnetic stripe reading block 124. An EMV contact block 126 can also be included in the card reader 120 and is coupled to an EMV reader 128 for reading and processing data that it provides to the processor 110. The card reader 120 also includes an EMV contactless antenna 130, coupled to a contactless EMV reader 132 for receiving and processing data from the antenna. The contactless antenna can also be used for near-field communication (NFC) and other low-power communication channels. A stopper 134 is included in the card reader 120 which is actuated by the solenoid 136 via the signal it receives from the processor 110. The card reader 120 also includes a discriminator contact 138 coupled to a controller 140 configured to take the electrical signal from the discriminator contact and provide the signal to the processor 110. In some embodiments, the controller 140 can be directly coupled to solenoid 136 to provide a signal to actuate stopper 134 when a chip-type card is inserted in the card reader. The signal from the discriminator contact is used to determine when an IC chip-type card is present in the card reader. The discriminator contact conducts across the surface of a metal pad of the chip-type card to determine when a chip-type card is inserted in the card reader. The signal provided by the discriminator contact can thus be used by the controller to provide an appropriate GUI display to the consumer based upon the type of card used in the payment transaction. More specifically, a magnetic stripe-type specific GUI is provided when a magnetic stripe-type card is inserted in the card reader and an IC chip-type card is provided when an IC chip-type card is inserted in the card reader. Note that the magnetic head reader 122, EMV contact block 126, EMV contactless antenna 130, stopper 134 and discriminator contact 138 are all shown as disposed within a single card reader which, for example, can comprise single slot on the payment terminal. In some embodiments, each payment reader can comprise a separate reader or reading position on the payment terminal, which can be appropriately distributed and/or dispersed throughout the payment terminal and/or on various surfaces thereof.

Figure 2A:
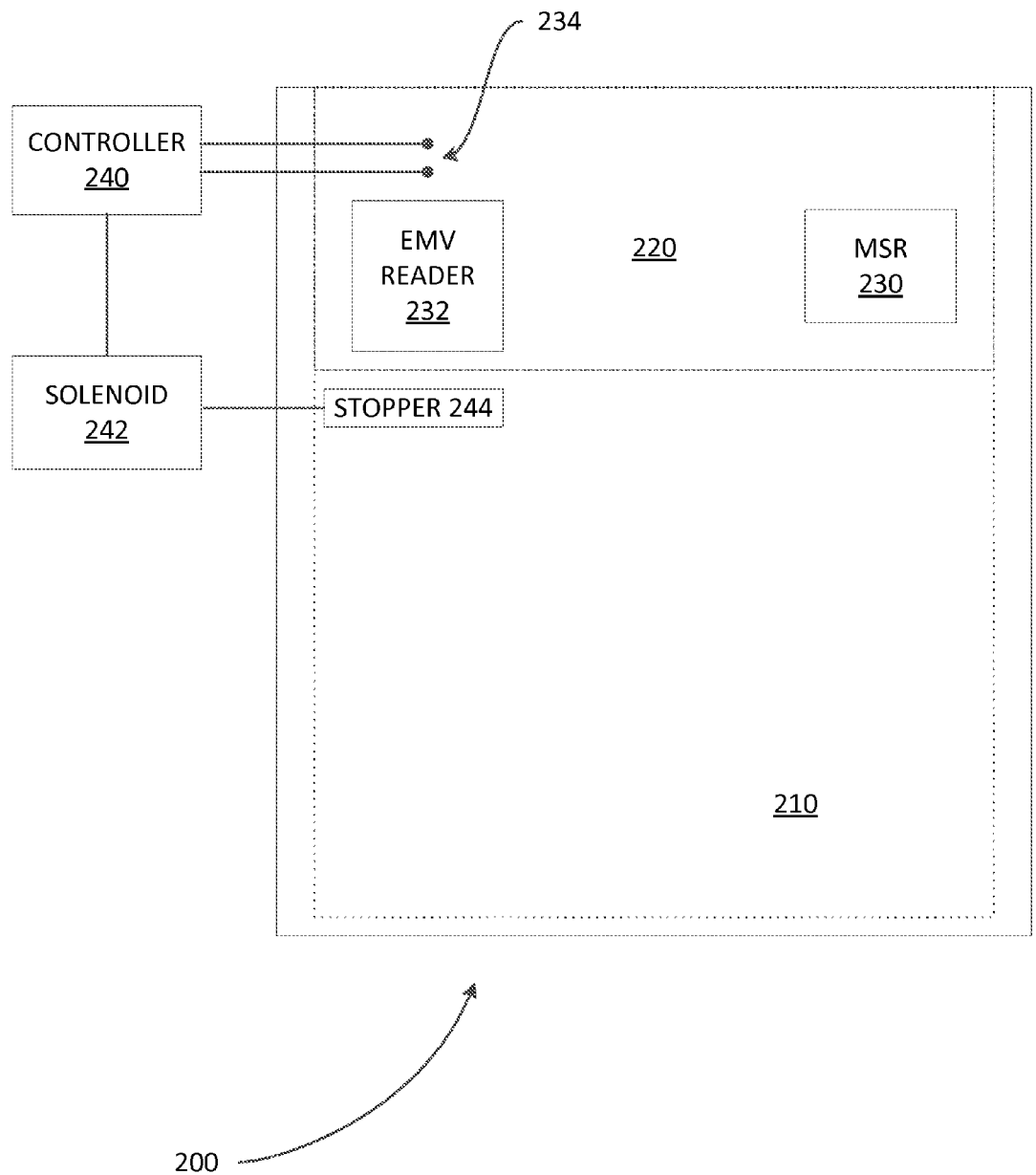
FIG. 2A illustrates an example schematic diagram of a card reader configured to receive both magnetic stripe-type cards and IC chip-type cards, the card reader having a discriminator contact in accordance with an embodiment.

FIG. 2A illustrates an example schematic diagram of a card reader configured to receive both magnetic stripe-type cards and IC chip-type cards, the card reader having at least one detector contact in accordance with an embodiment. The card reader, for example, can be the card reader 120 of FIG. 1. With reference to FIG. 2A, the card reader 200, delimited by the solid outer line, is configured to receive both a magnetic stripe-type card 210, defined by the inner dotted line, and a chip-type card 220, defined by the inner dashed line. The magnetic stripe-type card is read by a magnetic stripe reader 230. In this embodiment the magnetic stripe reader 230 is located at a lower position within the card reader 200 so that the magnetic stripe-type card 210 is read when fully inserted within the card reader 200. Refer, for example, to FIG. 3B showing an example cross-sectional side view of a card reader 325 with the magnetic read head 340 as being at a position on a first side 342 of the card reader. The chip-type card 220 is read by an EMV reader 232. Refer again to FIG. 3B showing the chip contact protrusions 334 as being on a second side 338 of the card reader.

The card reader includes at least two discriminator contacts 234 that are configured to determine the type of card present in the card reader 200 before the card reaches a depth sufficient for reading of a chip of the chip-type card. The discriminator contacts 234 are coupled to a controller 240 that sends a signal to a solenoid 242 when a chip-type card is detected by the discriminator contacts 234. The discriminator contacts 234 conduct across the surface of the metal pad of the IC chip card for a brief period of time as the chip card is inserted in the card reader and the metal pad passes by the discriminator contacts. The solenoid 242 is, in turn, coupled to a stopper 244 that is actuated by the signal received from the controller 240 to prevent a chip-type card from being fully inserted into the card reader 200. The discriminator contacts 234 are configured to detect a chip-type card by conducting across a metal pad (shown in FIG. 3A) of the chip-type card so that, when a circuit is complete (meaning, a metal pad has been detected), the controller 240 appropriately instructs the solenoid 242 to actuate the stopper 244. The signal from the controller 240 can also be used in accordance with the teachings herein to provide the appropriate user interface to the consumer, depending upon the particular payment card that is inserted in the card reader. The signal provided by the controller can also be used to provide an appropriate signal to indicate the payment card inserted in the card reader is a chip-type card. Thus, if the discriminator contacts detect a chip-type card, but the IC card reader is not able to read data off the IC chip, then the card can be identified as being a malfunctioning IC chip-type card. For example, if the card is not able to be read within a predetermined time period, then the customer or merchant can be notified that there is a problem with the card. Although two discriminator contacts are shown, in some embodiments, a single discriminator contact can be utilized to detect a chip-type card through methods such as capacitive sensing in which a stored electric charge at the discriminator contact is used as a capacitive probe to detect the metal pad of the IC chip card.

Figure 2B:
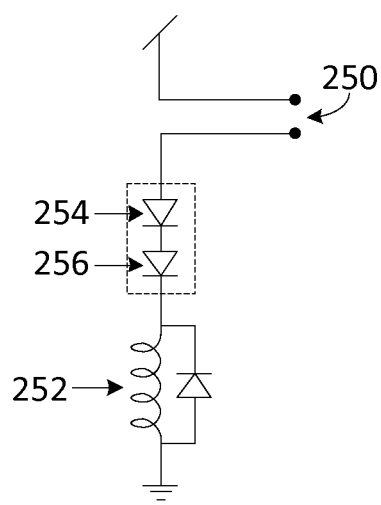
FIG. 2B illustrates an example schematic diagram of the electrical contact and solenoid-actuated stopper, in accordance with an embodiment

Reference is now made to FIG. 2B showing an example schematic diagram of discriminator contacts 250 and a solenoid 252 which actuates a stopper (not shown), in accordance with an embodiment. The discriminator contacts 250 are configured to conduct an electrical signal across the metal pad of an IC chip-type card (see, for example, metal pad 320A of FIG. 3A). The signal passes through a controller, represented by a pair of diodes 254 and 256, which send a signal to the solenoid 252 to actuate the stopper when an IC chip-type card is detected at the discriminator contacts 250.

A computing device (e.g., a mobile phone, a tablet computer, etc.) can be provided as a separate device that is in communication with the payment terminal or as a device integrated into the payment terminal. The computing device can run a merchant application or other financial transaction software that can provide functionality to facilitate a point-of-sale such as by enabling payment transactions. For example, in accordance with various embodiments, the merchant application can be downloaded and installed on the computing device. The software can be configured to operate with a card reader, where an individual can complete a financial transaction by swiping a magnetic stripe card through the card reader connected to the computing device.

In this example, the financial transaction can be any transaction that involves receiving or sending payment from one person to another. The magnetic stripe card can be, for example, a credit card, a debit card, or other types of payment authenticating pieces capable of carrying out the financial transaction. In accordance with various embodiments, the size of the card reader is miniaturized to be portable for connection with the computing device. The card reader is configured to reliably read data encoded in a magnetic stripe of the card with minimum error in a single swipe and provide a signal that corresponds to the data read to the computing device, which then decodes the incoming signal from the card reader and acts as a point-of-sale device to complete the financial transaction.

In accordance with various embodiments, the financial transaction card reader device can include a housing having a slot for swiping a magnetic stripe of a financial transaction card to complete the financial transaction. A read head in the housing reads data stored on the magnetic stripe and produces a signal indicative of data stored on the magnetic stripe. An output jack is adapted to be inserted into a microphone input associated with the computing device for providing the signal indicative of data stored on the magnetic stripe to the computing device, where the signal is then decoded in the computing device. In accordance with various embodiments, the card reader can be a device on an exterior surface of a portable computing device (e.g. mobile phone or tablet computer, etc.). The card reader can be a slot integrated within the portable computing device in some embodiments, and the card reader can be a separate component independent of the portable computing device in some embodiments.

Figure 3A:
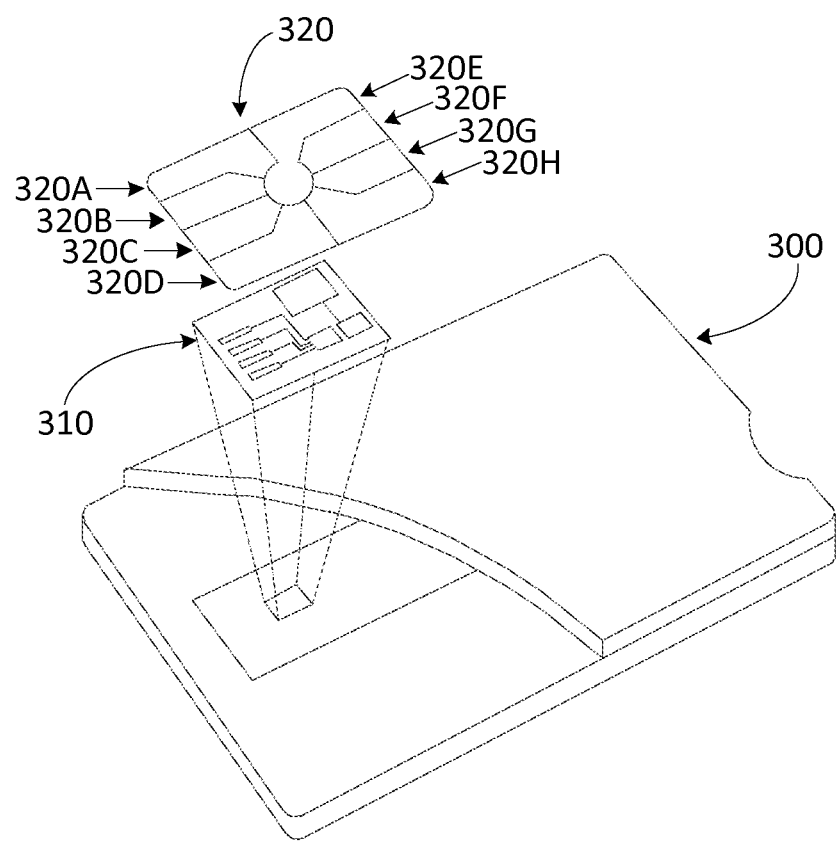
FIG. 3A illustrates an example partial cut-out view of an IC chip-type card, showing an internal IC chip and an external metal contact pad of the chip-type card, in accordance with an embodiment.
Figure 3B:
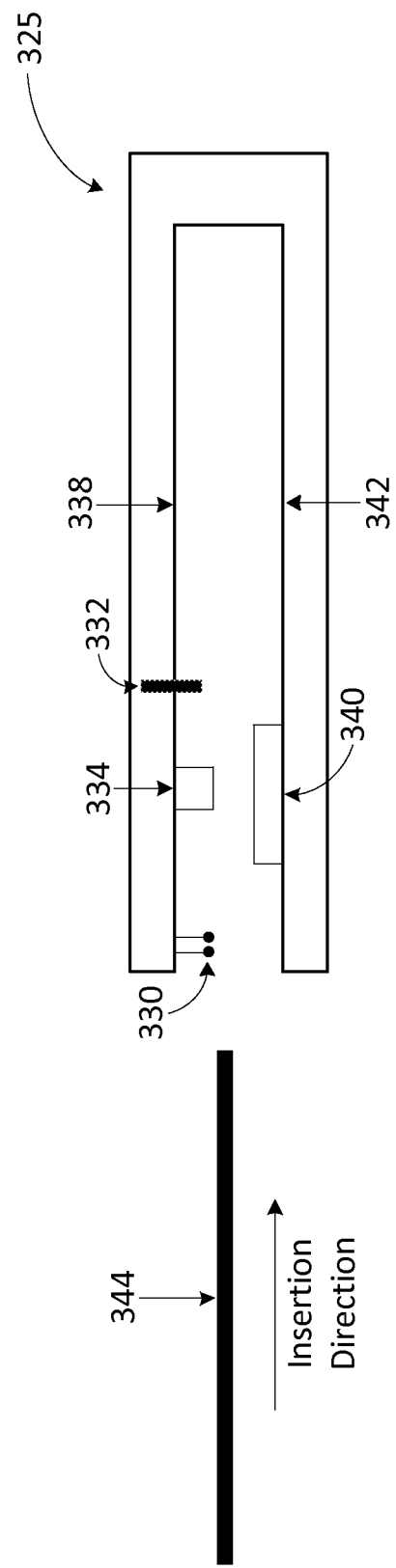
FIG. 3B illustrates an example cross-sectional side view of a card reader configured to receive both magnetic stripe-type cards and IC chip-type cards, the card reader having front located discriminator contacts in accordance with an embodiment.

FIG. 3A illustrates an example partial cut-out view of an IC chip-type card, showing an internal IC chip and an external metal contact array of the chip-type card in partial cut-out view, in accordance with an embodiment. A chip-type card 300 generally has an IC chip 310 embedded within the chip that has secure information stored therein, such as a PIN (personal identification number). The chip is covered with a metal contact array 320 that has a number of individual contact pads 320A, 320B, 320C, 320D, 320E, 320F, 320G, and 320H, each in contact with a different portion of the IC chip 310, depending upon the particular card manufacturer and/or design of the chip. The contact array 320 is generally formed from a plurality of individual metal pads and, accordingly, by conducting electricity across the surface of a single pad, it is possible to determine when an IC chip-type card is located within the card reader and differentiate from a magnetic stripe-type card which does not include such a metal pad. The discriminator contacts shown and described herein conduct electricity across the surface of the metal pad to determine when an IC chip-type card is present, and thus do not electrically interact with the IC chip buried deeper in the EMV card. This further allows for defective chip-type cards to be identified; when the metal pad is detected, yet the system is unable to communicate with the IC chip, this indicates the chip is defective.

In one embodiment of the current invention illustrated in FIG. 3B, a card reader 325 includes at least two discriminator contacts 330 on a second surface 338 that are located at the front of card reader 325 for early detection of the card type. There is also provided a stopper 332 that is solenoid-actuated via a signal received from the discriminator contacts 330 in accordance with the disclosures herein. A plurality of IC chip reading protrusions 334 are provided on an interior surface of the card reader 325 to contact all of pads 320A, 320B, 320C, 320D, 320E, 320F, 320G, and 320H for reading data off the IC chip embedded within an IC chip-type card. The stopper 332 is solenoid-actuated so that, when an IC chip-type card is detected, the card 344 is prevented from over-insertion within the card reader. The card reader 325 also includes a magnetic read head device 340 located on a first surface 342 of the card reader 325 for reading the magnetic stripe off of magnetic stripe-type cards. The magnetic head reading device 340 is positioned such that the entire magnetic stripe of the payment card passes by the device 340 to ensure the full magnetic stripe is read.

Figure 3C:
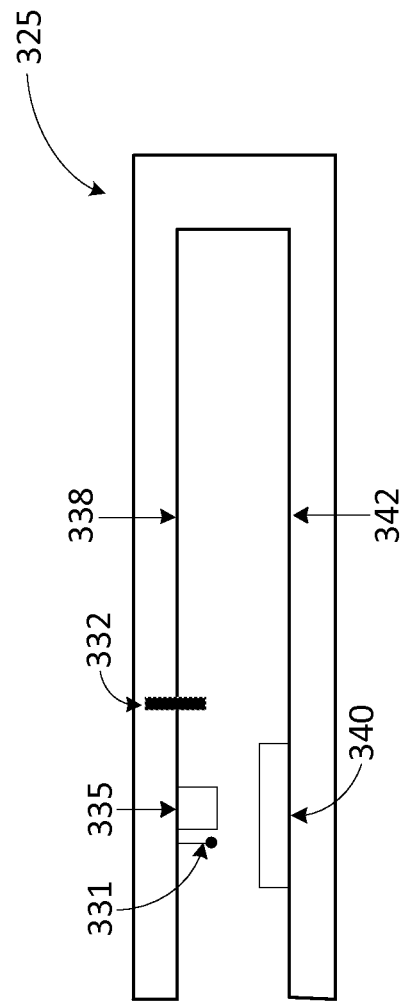
FIG. 3C illustrates an example cross-sectional side view of a card reader configured to receive both magnetic stripe-type cards and IC chip-type cards, the card reader having back located discriminator contacts in accordance with an embodiment.
Figure 3C:
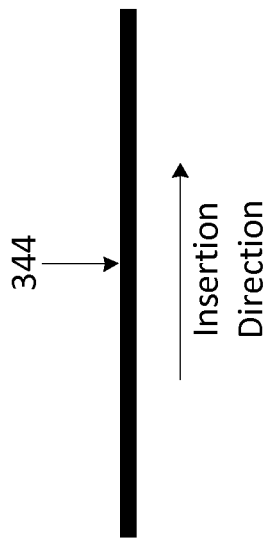

In another embodiment of the current invention shown in FIG. 3C, a card reader 325 includes at least one discriminator contact 331 located toward the back of card reader 325 and integrated with IC chip reading protrusions 335. The discriminator contact 331 is located adjacent to one of the plurality of IC chip reading protrusions 335 and, in certain embodiments, works in conjunction with said one IC chip reading protrusion to detect the card type in accordance with the disclosures herein. In other embodiments, two or more discriminator contacts can be integrated with the IC chip reading protrusions 335 to detect the card type without the use of the IC chip reading protrusions. There is also provided a stopper 332 that is solenoid-actuated via a signal received from the discriminator contacts 330 when a chip type card is detected. A plurality of IC chip reading protrusions 335 are provided on an interior surface of the card reader 325 to contact all of pads 320A, 320B, 320C, 320D, 320E, 320F, 320G, and 320H for reading data off the IC chip embedded within an IC chip-type card. The stopper 332 is solenoid-actuated so that, when an IC chip-type card is detected, the card 344 is prevented from over-insertion within the card reader. The card reader 325 also includes a magnetic read head device 340 located on a first surface 342 of the card reader 325 for reading the magnetic stripe off of magnetic stripe-type cards. The magnetic head reading device 340 is positioned such that the entire magnetic stripe of the payment card passes by the device 340 to ensure the full magnetic stripe is read.

Figure 4:
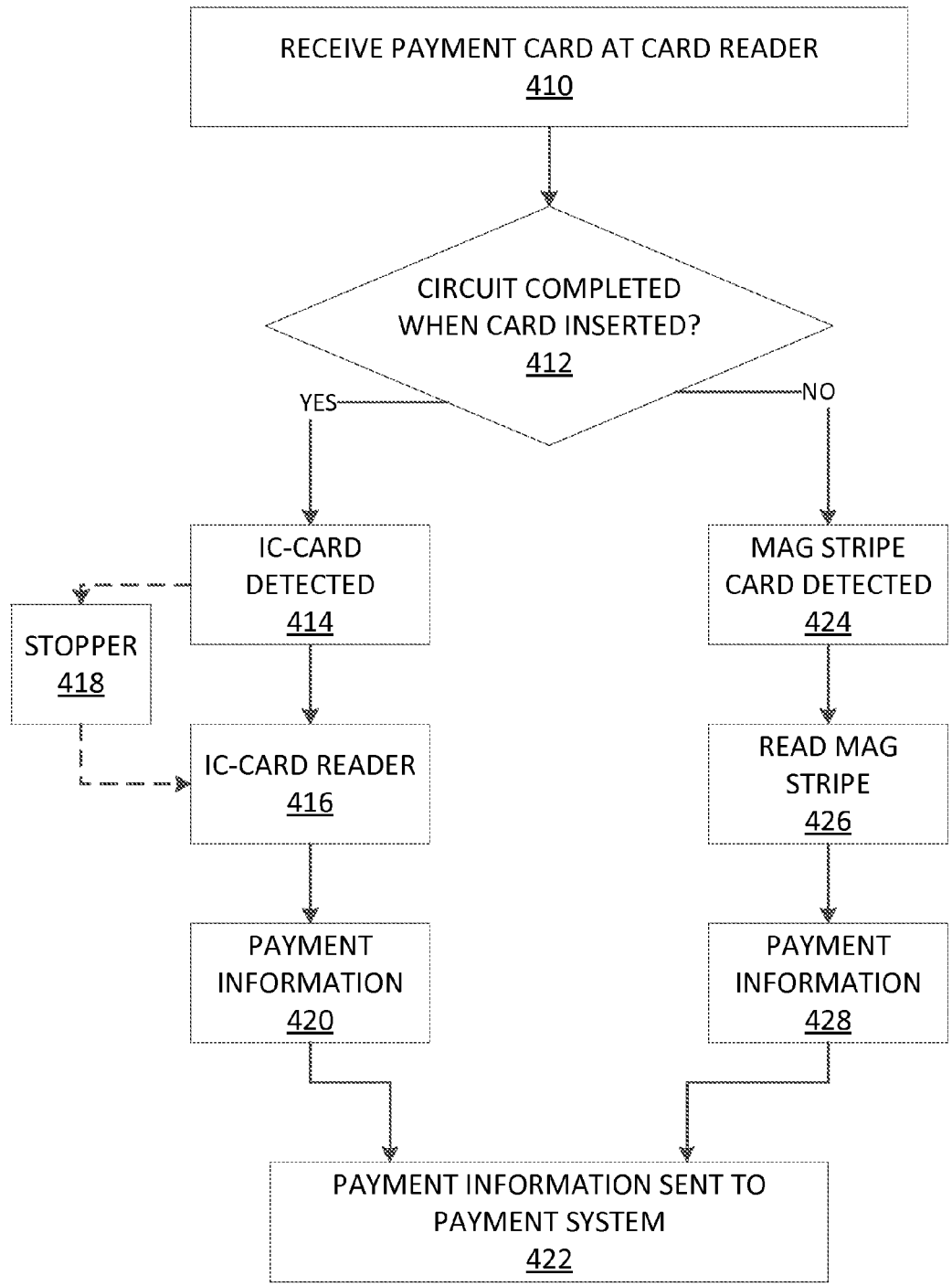
FIG. 4 illustrates an example process for conducting a financial payment transaction in accordance with various embodiments.

FIG. 4 illustrates an example process for conducting a financial payment transaction in accordance with various embodiments. A payment card is received in the card reader 410. The signal at the discriminator contact (for example, discriminator contact 234 in FIG. 2A) is used to determine if a circuit is completed. If the circuit is completed 412, an IC chip-type card is detected 414. The IC chip-type card reader is activated at 416 to read the chip-type card. The stopper 418 can optionally be activated to properly locate the chip-type card within the card reader. The payment information 420 is acquired and then sent to a payment system 422. If the circuit is not completed when the card is inserted 412, a magnetic stripe-type card is detected 424. The magnetic stripe is read 426 and payment information is acquired 428. The payment information is then sent to a payment system 422 for verification and/or denial of the payment transaction.

Having now described various example embodiments of the point-of-sale system used in a point-of-sale transaction, some example environments for conducting a financial transaction at a point-of-sale system will now be described. Other environments and applications of the point-of-sale system should be apparent to those ordinarily skilled in the art.

Figure 5:
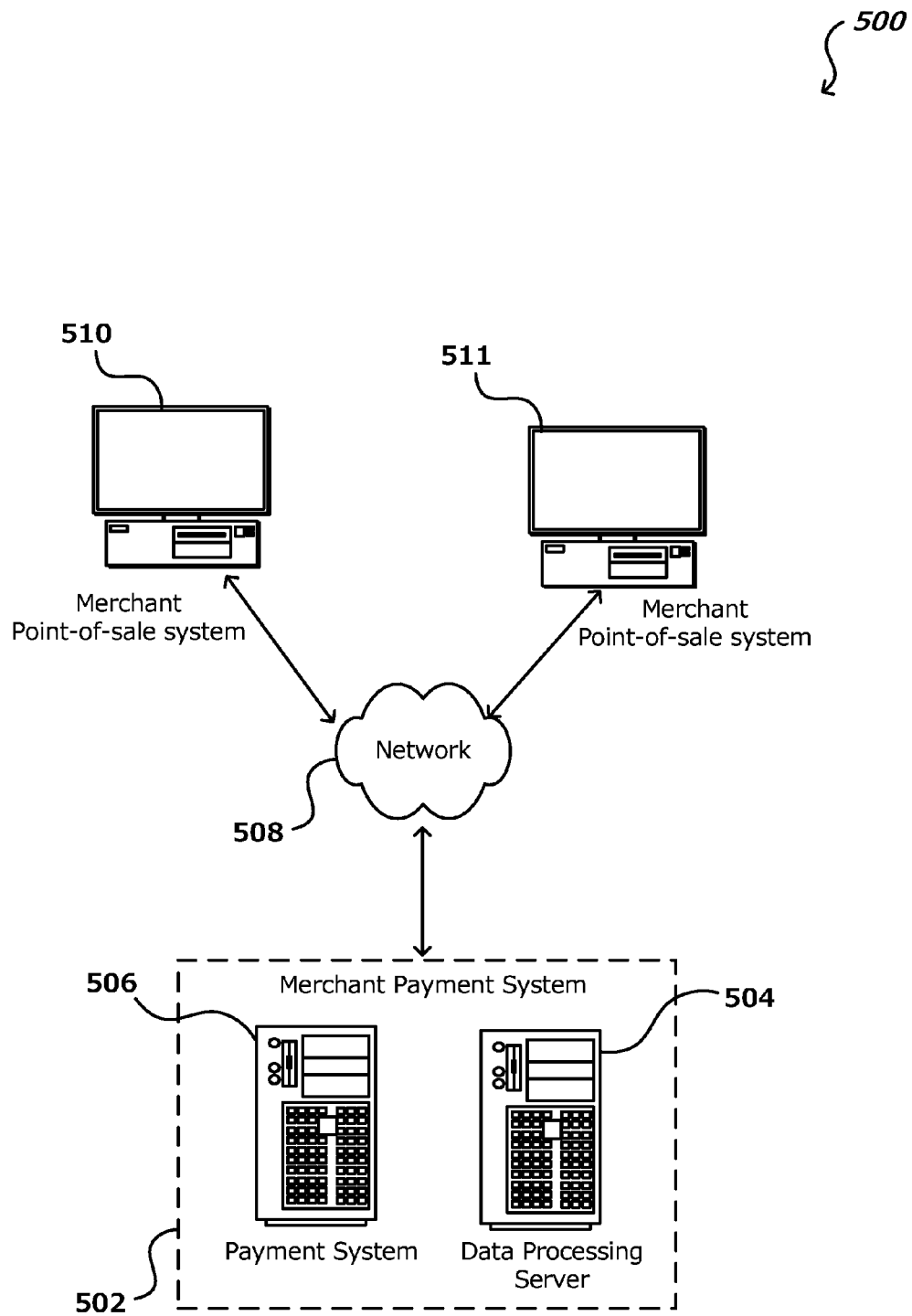
FIG. 5 illustrates an example environment for conducting a financial payment transaction in accordance with an embodiment.

FIG. 5 illustrates an example environment for conducting a financial transaction at a point-of-sale system in accordance with various embodiments. In this example, the example environment 500 includes a merchant payment system 502 for processing transactions between a customer and a merchant. The merchant payment system includes, for example, a data processing server 504 and a payment server 506. The data processing server can be implemented as computer programs on one or more computers in one or more locations, in which the systems, components, and techniques described below can be implemented. The operation of the payment server is described below in reference to FIG. 6. The example environment also includes computing devices, e.g., transaction registers or other point-of-sale systems, corresponding to the merchant 510 and 511.

As described, the point-of-sale systems 510 and 511 can include the hub (e.g., hub 204) and computing device, where the computing device can be coupled to or in communication with the merchant payment system through a data communication network 508, e.g., the Internet. These devices each generally include a memory, e.g., a random access memory (RAM), for storing instructions and data, and a processor for executing stored instructions. The devices and can each include one or more components, e.g., software or hardware, that are operable to send and receive requests, messages, or other types of information over the network. Some examples of computing devices include personal computers, cellular phones, handheld messaging devices, laptop computers, personal data assistants, tablet devices, and the like.

The network 508 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The devices and the referral system can communicate over the network using wired or wireless connections, and combinations thereof.

Each of the computing devices is configured to send to the merchant payment system respective financial data that corresponds to a financial transaction that was processed by the computing device. The financial data can include, for example, data stored in a financial payment card, e.g., Track 1 data, receipt email addresses, and information describing a card-less payment account. Other examples of financial data that can be captured includes purchase data, e.g., an itemized listing of purchases, card mix data, geolocation data indicating a geographic location of a particular transaction, online/offline card data, data describing the merchant, e.g., merchant category codes (MCCs), and any type of data that is received upon a customer's authentication into a social network.

Figure 6:
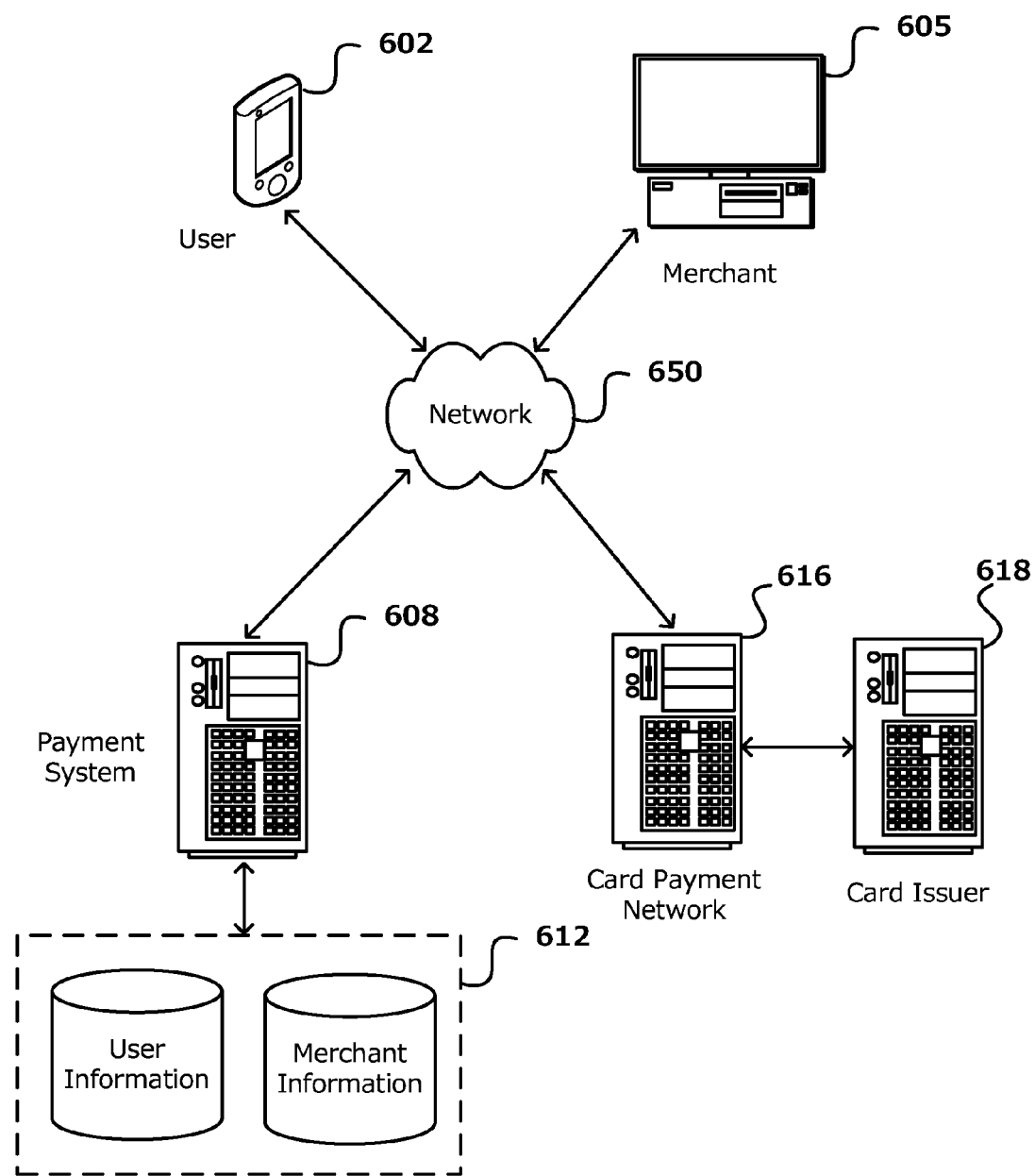
FIG. 6 illustrates an example environment for implementing a merchant payment system.

FIG. 6 illustrates an example of an environment 600 for implementing a payment service network. Although a mobile device environment is described for purposes of explanation, different environments may be used, e.g., a web-based environment, to implement various embodiments. The example environment includes a payment system 608, which can be implemented as computer programs on one or more computers in one or more locations, in which the systems, components, and techniques described below can be implemented. The example environment also includes a user device 602 and a merchant device 605.

The user device and the merchant device can each be a computer coupled to the payment system through a data communication network 650, e.g., the Internet. The user device and the merchant device each generally include a memory, e.g., a random access memory (RAM), for storing instructions and data, and a processor for executing stored instructions. The user device and the merchant device can each include one or more components, e.g., software or hardware, that are configured to respectively determine a geographic location of the user device or the merchant device, using, for example, various geolocation techniques, e.g., a global positioning system (GPS). Further, the user device and the merchant device can each be any appropriate device operable to send and receive requests, messages, or other types of information over the network. Some examples of user devices include personal computers, cellular phones, handheld messaging devices, laptop computers, personal data assistants, tablet devices, and the like.

The network can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The payment system, the merchant device, and the user device can communicate over the network using wired or wireless connections, and combinations thereof.

As used in this specification, a financial transaction is a transaction that is conducted between a customer and a merchant at a point-of-sale. When paying for a financial transaction, the customer can provide the merchant with cash, a check, or credit card for the amount that is due. The merchant can interact with a point-of-sale device, e.g., merchant device, to process the financial transaction. During financial transactions, the point-of-sale device can collect data describing the financial transaction, including, for example, the amount of payment received from customers.

In some implementations, the payment system is configured to accept card-less payment transactions from customers, e.g., the customer. As used in this specification, a card-less payment transaction is a transaction conducted between the customer and a merchant at the point-of-sale during which a financial account of the customer is charged without the customer having to physically present a financial payment card to the merchant at the point-of-sale. That is, the merchant need not receive any details about the financial account, e.g., the credit card issuer or credit card number, for the transaction to be processed.

Before conducting card-less payment transactions, the customer typically creates a user account with the payment system. The customer can create the user account, for example, by interacting with a user application that is configured to perform card-less payment transactions and that is running on the user device. When creating a user account with the payment system, the customer will provide information of the customer, data describing a financial account of the customer, e.g., credit card number, expiration date, and a billing address. This user information can be securely stored by the payment system, for example, in a user information database. To accept card-less payment transactions, the merchant typically creates a merchant account with the payment system by providing information describing the merchant including, for example, a merchant name, contact information, e.g., telephone numbers, the merchant's geographic location address, and one or more financial accounts to which funds collected from users will be deposited. This merchant information can be securely stored by the payment system, for example, in a merchant information database.

The payment system is configured to perform card-less payment transactions. The payment system can include one or more servers that are configured to securely perform electronic financial transactions, e.g., electronic payment transactions, between a customer and a merchant, for example, through data communicated between the user device and the merchant device. Generally, when a customer and a merchant enter into an electronic financial transaction, the transaction is processed by transferring funds from a financial account associated with the user account to a financial account associated with the merchant account.

The payment system is configured to send and receive data to and from the user device and the merchant device. For example, the payment system can be configured to send data describing merchants to the user device using, for example, the information stored in the merchant information database 612. For example, the payment system can communicate data describing merchants that are within a threshold geographic distance from a geographic location of the user device, as described in this specification. The data describing merchants can include, for example, a merchant name, geographic location, contact information, and an electronic catalogue, e.g., a menu, that describes items that are available for purchase from the merchant.

In some embodiments, the payment system is configured to determine whether a geographic location of the user device is within a threshold geographic distance from a geographic location of the merchant device. The payment system can determine a geographic location of the user device using, for example, geolocation data provided by the user device. Similarly, the payment system can determine a geographic location of the merchant device using, for example, geolocation data provided by the merchant device or using a geographic address, e.g., street address, provided by the merchant. Depending on the implementation, the threshold geographic distance can be specified by the payment system or by the merchant.

Determining whether the user device is within a threshold geographic distance of the merchant device can be accomplished in different ways including, for example, determining whether the user device is within a threshold geographic radius of the merchant device, determining whether the user device is within a particular geofence, or determining whether the user device can communicate with the merchant device using a specified wireless technology, e.g., Bluetooth or Bluetooth low energy (BLE). In some embodiments, the payment system restricts card-less payment transactions between the customer and the merchant to situations where the geographic location of the user device is within a threshold geographic distance from a geographic location of the merchant device.

The payment system can also be configured to communicate with a computer system 616 of a card payment network, e.g., Visa or MasterCard, over the network, or over a different network, for example, to conduct electronic financial transactions. The computer system of the card payment network can communicate with a computer system 616 of a card issuer, e.g., a bank. There may be computer systems of other entities, e.g., the card acquirer, between the payment system and the computer system of the card issuer.

The customer operating the user device that is within a threshold geographic distance of the merchant can interact with a user application running on the user device to conduct a card-less payment transaction with the merchant. While interacting with the user application, the customer can select the merchant, from a listing of merchants, with whom the customer wants to enter into a card-less payment transaction. The user can select the merchant, for example, by selecting a "check in" option associated with the merchant.

The user device can communicate data to the payment system indicating that the customer has checked in with the merchant. In response, the payment system can communicate data to notify the merchant device that the user has checked in. A merchant application running on the merchant device can notify the merchant that the user has electronically checked in with the merchant through a display screen of the merchant device.

Once checked in, the customer can collect, or request, items that are available for purchase from the merchant. When the customer is ready to enter into the card-less payment transaction, the customer can, for example, approach a point-of-sale for the merchant and identify him or herself. For example, the customer can verbally notify the merchant that the customer wants to enter into a card-less payment transaction and can provide the merchant with the customer's name. The merchant can then interact with the merchant application to select the customer, from a listing of customers that have checked in with the merchant, to initiate a card-less payment transaction for the items being purchased by the customer. For example, the merchant can determine a total amount to bill the customer for the items being purchased. The customer can verbally approve the total amount to be billed and, in response, the merchant can submit a request for a card-less payment transaction for the total amount to the payment system. In response, the payment system can obtain, for example, from the user information database, data describing a financial account associated with a user account of the customer to which the total amount will be billed.

The payment system can then communicate with the computer system of a card payment network to complete an electronic financial transaction for the total amount to be billed to the customer's financial account. Once the electronic financial transaction is complete, the payment system can communicate data describing the card-less payment transaction to the user device, e.g., an electronic receipt, which can, for example, notify the customer of the total amount billed to the user for the card-less payment transaction with the particular merchant.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A card reader that is a component of a point-of-sale system that includes a portable computing device in communication with the card reader, wherein the portable computing device is configured to present a graphical user interface when a payment card is received at the card reader, the card reader comprising:

a slot configured to receive an integrated circuit (IC) chip-type card during a point-of-sale transaction, the IC chip-type card having an IC chip embedded therein and a metal pad on an exterior surface of the IC chip-type card;

an electrical contact positioned on an interior surface of the slot and that is configured to conduct across an exterior surface of the metal pad of the IC chip-type card and detect the IC chip-type card when the metal pad of the IC chip-type card completes a circuit with the electrical contact, and the electrical contact is further configured to create an electric signal when the electrical contact is in electrical communication with the metal pad of the IC chip-type card;

a plurality of IC chip reading protrusions positioned on the interior surface of the slot and configured to read data from the IC chip embedded within the IC chip-type card; and a controller in electrical connection with the electrical contact, the controller configured to interpret the electric signal when the electrical contact is in electrical communication with the metal pad of the IC chip-type card, the controller is further configured to cause the portable computing device to present the graphical user interface when the IC chip-type card is received in the slot.

2. The card reader of claim 1, further comprising:
a magnetic reading device included in the slot that is configured to read data off a magnetic stripe of a magnetic stripe-type card.

3. The card reader of claim 1, wherein the electrical contact is separated from the plurality of protrusions on the interior surface.

4. The card reader of claim 3, further comprising:
a second electrical contact positioned proximate the electrical contact on the interior surface, wherein the electrical contact and the second electrical contact are configured to detect the metal pad of the IC chip-type card when the electrical contact and the second electrical contact are in electrical communication with the metal pad of the IC chip-type card.

5. The card reader of claim 1, wherein the electrical contact is positioned adjacent to one of the plurality of IC chip reading protrusions.

6. The card reader of claim 5, wherein the electrical contact and the one of the plurality of IC chip reading protrusions are configured to detect the metal pad of the IC chip-type card when the electrical contact and the one of the plurality of IC chip reading protrusions are in electrical communication with the metal pad of the IC chip-type card.

7. The card reader of claim 1, further comprising:
a contactless antenna for reading data wirelessly from the IC chip embedded with the IC chip-type card.

8. The card reader of claim 1, wherein the controller comprises a pair of diodes that generates a signal when the metal pad of the IC chip-type card is detected.

9. A payment terminal, the payment terminal including a portable computing device that is configured to present a graphical user interface, the payment terminal comprising:
a card reader configured to receive a payment card during a point-of-sale transaction;
an integrated circuit (IC) chip reading device included in the card reader that is configured to read data off an IC chip embedded within an IC chip-type card;
an electrical contact included in the card reader that is configured to detect a metal pad on an exterior surface of the IC chip-type card that covers the IC chip; and
a controller in electrical communication with the electrical contact and configured to interpret the electric signal when the electrical contact is in electrical communication with the metal pad of the IC chip-type card, and cause the portable computing device to present the graphical user interface when the IC chip-type card is received.

10. The payment terminal of claim 9, wherein the IC chip reading device comprises a plurality of IC chip reading protrusions configured to read data from the IC chip embedded within the IC chip-type card.

11. The payment terminal of claim 9, wherein the IC chip reading device comprises a contactless antenna configured to read data wirelessly from the IC chip embedded within the IC chip-type card.

12. The payment terminal of claim 9, further comprising:
a slot, the slot having an interior surface that includes the IC chip reading device.

13. The payment terminal of claim 12, wherein the electrical contact is positioned on the interior surface of the slot.

14. The payment terminal of claim 9, further comprising:
a magnetic reading device included in the slot that is configured to read data off a magnetic stripe of a magnetic stripe-type card.

15. The payment terminal of claim 9, wherein the electrical contact determines when the IC chip-type card is inserted in the card reader by conducting an electrical signal across the metal pad on an exterior surface of the IC chip-type card.

16. A card reader configured to communicate with an integrated circuit (IC) chip card via a contact array of the IC chip card, the contact array including a plurality of contact pads, the card reader comprising:
a first electrical contact configured to contact a contact pad of the plurality of contact pads;
a second electrical contact configured to contact the contact pad; and
a controller in electrical communication with the first electrical contact and the second electrical contact that is configured to detect a closed circuit including the first electrical contact, the second electrical contact, and the contact pad while the first electrical contact is contacting the contact pad.

17. The card reader of claim 16, wherein the first electrical contact is further configured to communicate with an IC chip of the IC chip card via the contact pad of the plurality of contact pads.

18. The card reader of claim 16, further comprising:
a magnetic reading device that is configured to read data off a magnetic stripe of a magnetic stripe card.

19. The card reader of claim 16, further comprising:
a slot having an interior surface, wherein the first electrical contact and the second electrical contact are positioned on the interior surface of the slot.

20. The card reader of claim 16, further comprising:
a contactless antenna within the card reader, the contactless antenna configured to read data wirelessly from the IC chip embedded within the IC chip card.

* * * * *